United States Patent [19]
Hubbard et al.

[11] Patent Number: 5,406,943
[45] Date of Patent: * Apr. 18, 1995

[54] METHOD OF MANUFACTURING A LIQUID SHIELD

[75] Inventors: Vance M. Hubbard; Welton K. Brunson, both of Bedford, Tex.

[73] Assignee: TCNL Technologies, Inc., Fort Worth, Tex.

[ * ] Notice: The portion of the term of this patent subsequent to Jun. 4, 2008 has been disclaimed.

[21] Appl. No.: 2,914

[22] Filed: Jan. 11, 1993

Related U.S. Application Data

[63] Continuation-in-part of Ser. No. 886,386, May 19, 1992, Pat. No. 5,383,450, which is a continuation of Ser. No. 661,435, Feb. 25, 1991, Pat. No. 5,150,703, which is a continuation of Ser. No. 268,558, Nov. 8, 1988, Pat. No. 5,020,533, which is a continuation-in-part of Ser. No. 104,807, Oct. 2, 1987, Pat. No. 4,920,960.

[51] Int. Cl.⁶ .................... A62B 18/00; A62B 18/02; A61F 9/04
[52] U.S. Cl. .................... 128/206.12; 128/201.17; 128/206.23; D29/110
[58] Field of Search .................... 128/857, 863, 201.15, 128/201.17, 206.12, 206.13, 206.19, 206.21, 206.16, 206.23, 206.24, 206.27, 206.28, 201.12; 2/8, 9, 12, 13, 15, DIG. 7, 427, 428, 431, 432, 435, 436; D16/117, 119, 120, 102; D29/9, 17, 8

[56] References Cited

U.S. PATENT DOCUMENTS

| | | | |
|---|---|---|---|
| D. 327,141 | 6/1992 | Hubbard et al. | D29/9 |
| 4,635,628 | 1/1987 | Hubbard et al. | 128/201.17 |
| 5,020,533 | 6/1991 | Hubbard et al. | 128/206.23 |
| 5,107,547 | 4/1992 | Scheu | 2/206 |
| 5,150,703 | 9/1992 | Hubbard et al. | 128/206.12 |

*Primary Examiner*—Kimberly L. Asher
*Attorney, Agent, or Firm*—Baker & Botts

[57] ABSTRACT

The present invention provides a method of manufacturing an apparatus for shielding fluids from the eyes and face of an attendant. The apparatus and method utilize a plastic visor and face mask that are connected. The visor and face mask are secured to the head of the wearer by tie strips that are attached to the mask and visor so as to hold the shield near the wearer's face. The visor has cushioning strips attached to distribute the pressure of the visor over a large area of the wearer's forehead and has side extensions that protect the eyes from fluids propelled toward the wearer from a side angle relative to wearer's face.

1 Claim, 3 Drawing Sheets

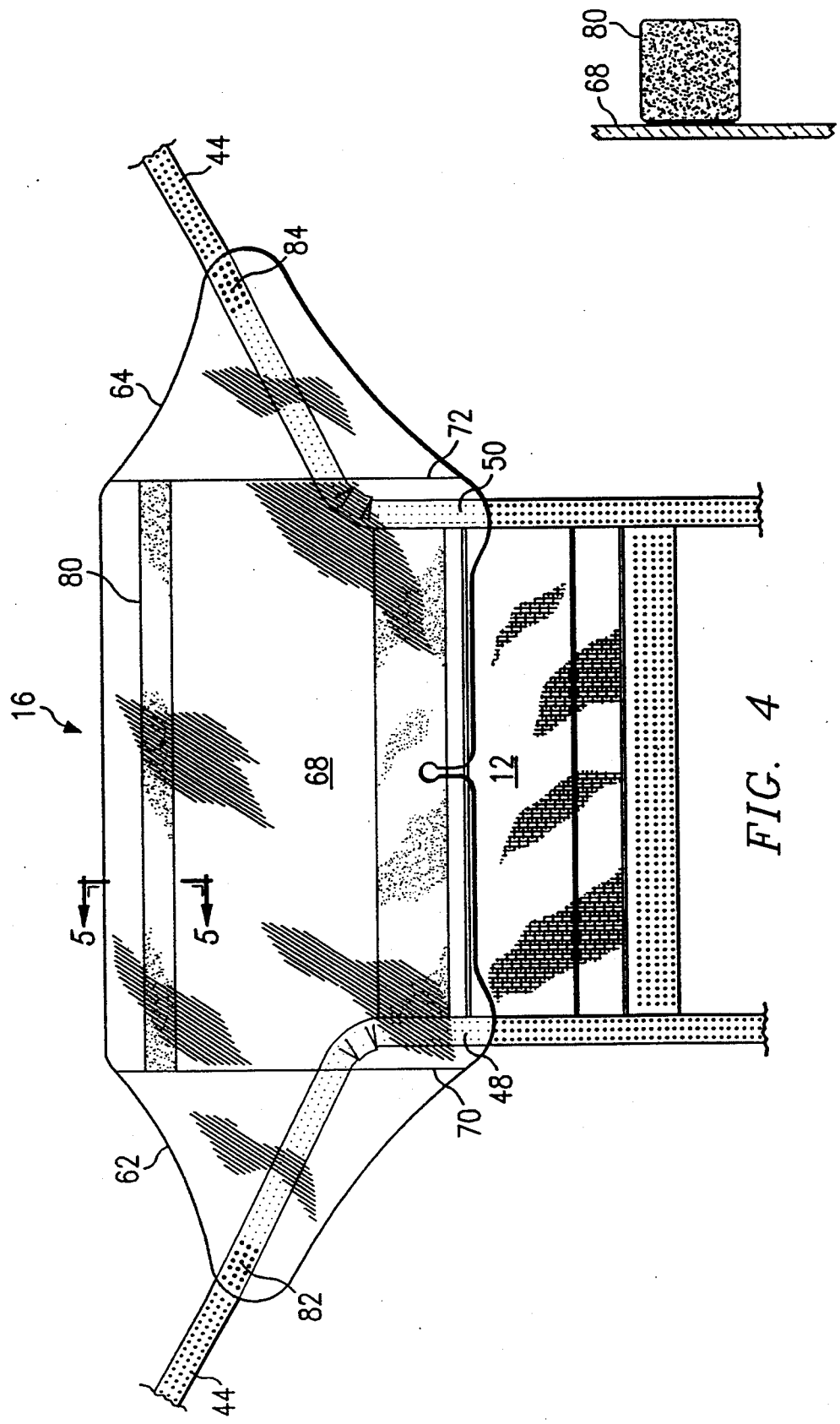

METHOD OF MANUFACTURING A LIQUID SHIELD

RELATED APPLICATION

This is a continuation-in-part application of U.S. application Ser. No. 07/886,386, filed May 19, 1992, by Vance M. Hubbard and Welton K. Brunson, now U.S. Pat. No. 5,383,450, issued Jan. 24, 1995, which is a continuation of application Ser. No. 07/661,435, filed Feb. 25, 1991, by Vance M. Hubbard and Welton K. Brunson, now U.S. Pat. No. 5,150,703, issued Sep. 29, 1992, which is a continuation of application Ser. No. 07/268,558, filed Nov. 8, 1988, by Vance M. Hubbard and Welton K. Brunson, now U.S. Pat. No. 5,020,533, which is a continuation-in-part of application Ser. No. 07/104,807, filed Oct. 2, 1987 by Vance M. Hubbard and Welton K. Brunson, now U.S. Pat. No. 4,920,960.

TECHNICAL FIELD OF THE INVENTION

This invention relates in general to disposable medical products, and in particular, but not by way of limitation, to a disposable face mask with a visor to prevent liquid from contacting the eyes and face of a wearer.

BACKGROUND OF THE INVENTION

The wearing of a protective face mask has become standard procedure in many health care and other related activities. The use of a face mask is important, for example, to lab technicians during the conducting of tests, to nurses in the care of patients, to physicians during surgery and other treatment, and to dentists working in a patient's mouth.

The rapid increase of infectious diseases, particularly AIDS, has made the use of protective equipment more important. The Center for Disease Control in Atlanta, Ga., has found that the AIDS virus (HIV) can be passed by contact with body fluids. Contact of AIDS contaminated body fluids with another person's source of body fluids, e.g., eyes, nose, mouth, etc., can pass the disease. Therefore, it is necessary to prevent a patient's body fluids from contacting the eyes, nose, and mouth of an attendant.

The typical protective mask covers the wearer's face from the bridge of the nose to below the chin and is generally designed to filter out germs and other particulates. Unfortunately, a mask designed to prevent the passage of germs has little value in preventing liquids from reaching the face, and thus normal face masks provide the wearer with minimal protection against exposure to the patient's body fluids which may contain the AIDS virus.

Some protective masks, such as the Irema Shield Mate (Catalog No. SM5000), keep liquids from the eyes of the wearer, but are susceptible to problems which detract from their effectiveness. In such masks, a solid sheet of relatively stiff clear plastic is fixed by double sided tape to opposite ends of the mask. When the mask is placed on a wearer's face, the plastic tends to remain flat and therefore pulls away from the contours of the face creating gaps. Additionally, the tendency of the visor to remain straight forces the plastic into the wearer's forehead which causes discomfort. Similar designs have a problem with the visor dangling loosely in front of the attendant's face.

If a wearer of the Irema Shield Mate mask attempts to compensate for failure of the plastic to conform to their face, over compensation generally results and the plastic develops a crease. Plastic is susceptible to glare and reflections, and a crease in the plastic tends to increase the glare and reflections by increasing the number of surfaces that may reflect light.

Another liquid shield is available from Ballard Medical Products under the Product name Safety Shield Kit. The eye shield contained in the kit is similar to a pair of goggles with its own elastic fasteners for securing around the wearer's head. The multiple components of the Ballard Kit detract from the convenience of a one piece shield. Thus, there is a need for a convenient, comfortable protective eye and face shield visor that will prevent the passage of liquid to the eyes of the wearer, will not crease, and does not reflect glare into the eyes.

SUMMARY OF THE INVENTION

The present invention disclosed herein comprises a method and apparatus for a fluid shield visor and a face mask that substantially eliminates or reduces problems associated with prior shields. The present invention inhibits the passage of liquids through the visor to the eyes of a wearer without becoming creased or reflecting glare into the eyes of the wearer and provides enhanced comfort to the wearer.

In one aspect of the present invention, a cover comprises a liquid shield visor secured to a mask that is resistant to the passage of liquids from the exterior of the mask to the face of the wearer. The liquid shield visor comprises a clear plastic such as polyethylene or polyester having a notched cutout to facilitate conformance to various facial configurations and reduce the likelihood of reflections. Additionally, the mask has a cushioning strip to cushion the point of contact of the visor with the wearer's forehead, and the visor has foldable side extensions attached to tie strips so as to shield fluids propelled straight toward the wearer's face as well as from a side angle.

It is a technical advantage of the present invention that the mask may be worn without the need for a separate eye protection device. It is a further technical advantage that the shield will allow the mask to conform to the contours of the face of a wearer without creasing the visor. It is a further technical advantage that the shield in conjunction with tie strips or elastic loops protects the wearer's eyes from contacting fluids propelled directly toward the wearer's face or from the side of the wearer's face by wrapping side extensions of the visor around the wearer's face. It is a further technical advantage that cushioning strips attached to the visor distribute any forces between the visor and the wearer's face or forehead over a larger area thereby making the shield more comfortable to wear. Finally, it is a technical advantage that the shield may be stored flat.

BRIEF DESCRIPTION OF THE DRAWINGS

For a more complete understanding of the present invention and for the further advantages thereof, reference is now made to the following Detailed Description taken in conjunction with the accompanying drawings, in which:

FIG. 4 is a front elevational view of a mask and visor constructed according to the present invention.

FIG. 5 is a side elevational view of a portion of a visor constructed according to the present invention.

DETAILED DESCRIPTION OF THE INVENTION

Figure 1:
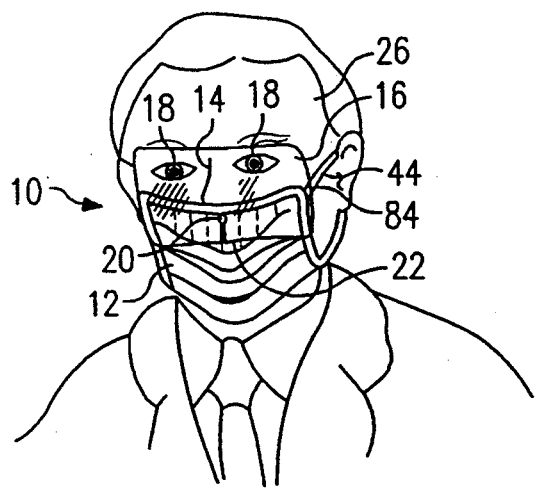
FIG. 1 is a perspective view of a liquid resistant visor on a face mask constructed in accordance with the present invention.

Reference is now made to the drawings wherein like parts are designated with like numerals throughout. Referring to FIG. 1, a liquid-resistant face shield 10 constructed in accordance with the present invention is shown in perspective. A mask 12 retards the flow of liquids from the exterior of the mask to the nose 14 and mouth of a wearer. A visor 16, fixed to opposite ends of the mask 12, inhibits liquids from splashing into the eyes 18 of the wearer.

The visor 16 has a notch 20 formed therein to allow the visor 16 to bend without creasing. Bending the visor 16 allows the mask 12 to conform to the face of the wearer and still prevent liquid from splashing into the eyes 18. A darkened strip 22 may also be provided to further reduce glare. Fastening devices, for example, elastic loops 24 or tie strips 44, may be provided to removably attach the shield 10 to the head 26 of the wearer. The elastic loops 24, or tie strips 44 (FIG. 2), are attached to the mask 12 at specified bonding areas 48 and 50 (FIG. 2) and to the visor at bond areas 82 and 84.

Figure 2:
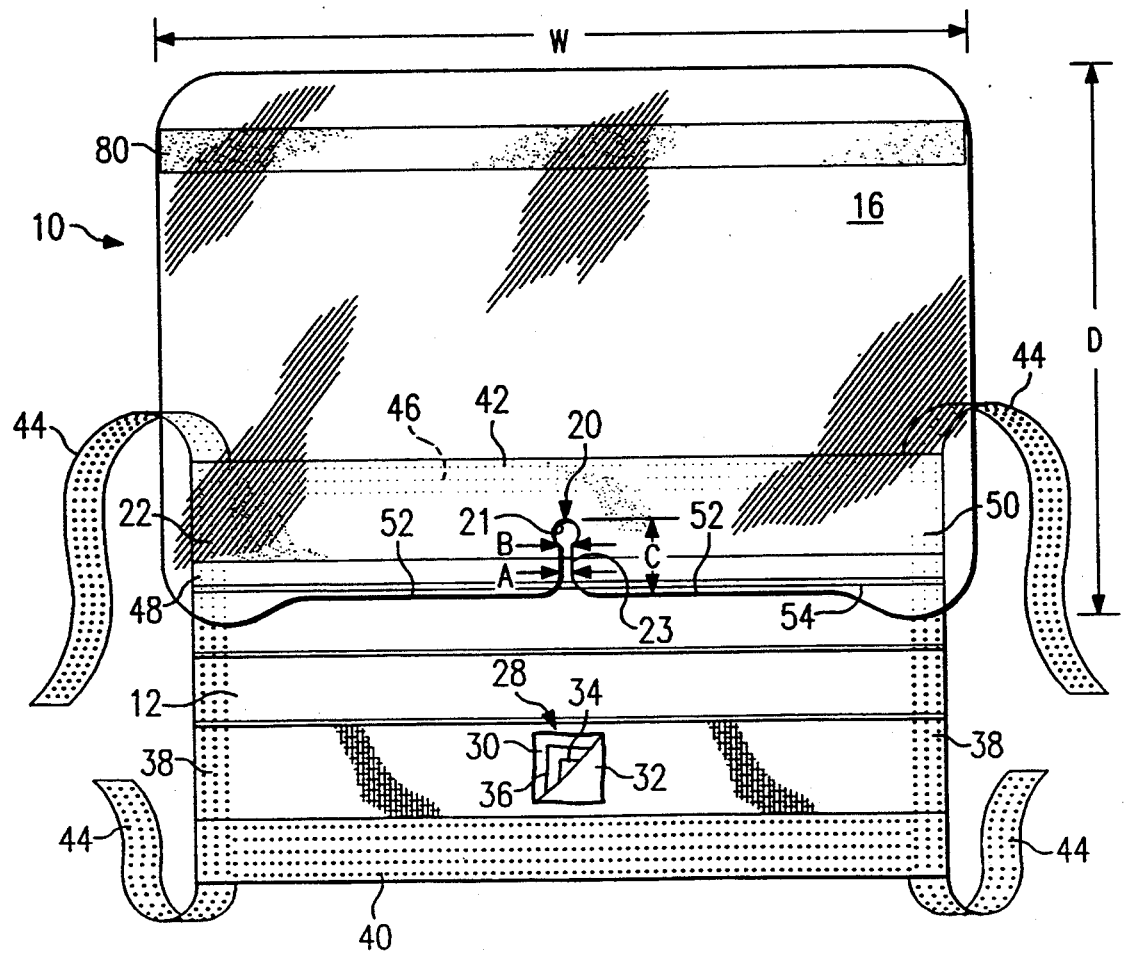
FIG. 2 is a front elevational view of a mask and visor constructed in accordance with one aspect of the present invention.

Referring now to FIG. 2, the liquid-resistant shield 10 constructed in accordance with the present invention is shown in a front elevational view. The mask 12 is of the disposable layered type which is designed specifically to prevent or retard the passage of liquids from external the mask to the face of the wearer. The mask 12 is fabricated in general as disclosed in U.S. Pat. No. 4,635,628, Jan. 13, 1987, to Hubbard et al., and assigned to Tecnol Medical Products, Inc., and is incorporated herein by reference.

Face mask 12, as shown by the cutaway portion of FIG. 2 near flap 28, has four layers of material with an external surface of cover stock 30 as the outermost layer. The innermost layer, internal surface 32, is constructed of a light weight, highly porous, softened, non-irritating, non-woven fabric, such as, for example, Dexter, Inc. product No. 3768. The internal surface 32 is designed to prevent unwanted materials such as facial hair, loose fibers or perspiration from contacting the next outermost layers since that might cause a wicking effect to draw liquids therethrough. The internal surface 32 also provides a comfortable surface for contact with the face of the wearer.

The next outermost layer comprises a barrier material 34 that is capable of differentiating between gases and liquids and may be, for example, Visqueen Film Products' low density polyethylene, Vispore X-6212. Non-wetting materials, such as that used to form barrier material 34, have small apertures which prevent liquids with a relatively high surface tension from passing therethrough yet will allow gases with a low surface tension to pass therethrough. It is preferable to have the apertures as large as possible to allow easy breathing, and yet small enough to retard or prevent the flow of liquids. The barrier material 34 is designed to freely pass gases in either direction, while restricting the passage of liquids in at least on direction. The mask 12 is constructed with the barrier material 34 positioned to restrict liquid passage from the exterior of the mask 12. Further description of the construction and operation of the barrier material may be found in U.S. Pat. No. 3,929,135, Dec. 30, 1975, to Thompson, assigned to Proctor and Gamble Co., and is incorporated herein by reference.

The next outermost layer is a filtration media 36, which may be, for example, melt blown polypropylene or polyester. The filtration media 36 inhibits the passage of airborne bacteria in either direction which will prevent passage of germs to and from the wearer of the mask 12. The next and outermost layer is the external surface material 30, which may be treated, for example, by spraying with a liquid repellant to render the external surface material 30 resistant to liquids.

The outer surface material 30 and the filtration media 36 serve as an aid to the barrier material 34 by slowing down any liquid that may be splashed, sprayed or thrown at the mask 12. By requiring the liquid to pass through these two outer layers prior to reaching the barrier material 34, the liquid will have less pressure and the barrier material 34 will be better able to prevent passage of the liquid.

The mask 12 can be provided with heat sealed, glued, or ultra-sonically sealed edges 38, 40, and 42. The attaching devices, such as tie strips 44, may be integral with the sealed edges 38. The edge 42 may have an included stiffening device 46 to allow molding of the mask 12 around the wearer's nose 14, and thus, provides a better fit.

Visor 16 comprises a clear plastic film, such as, for example, polyester or polyethylene, and is generally dimensioned to fit across the width of mask 12 and extend over the eyes of the wearer. The plastic material comprising visor 16 may have a thickness of approximately 0.005 inches so that it will be stiff enough to prevent collapse and yet flexible enough to bend.

Visor 16 is fixed at the lower lateral edges to the opposite edges of mask 12 at bond areas 48 and 50, which can be formed by adhesives, ultra-sonic seals, or heat seals. The bond areas 48 and 50 are only of sufficient area (approximately $\frac{1}{4}$ inch $\times \frac{1}{2}$ inch) to secure visor 16 to mask 12. It has been found that the visor 16 more easily adapts to the contours of the face of the wearer if the bond areas 48 and 50 do not extend across the entire width of the mask 12. If the bond areas 48 and 50 were to extend across the mask 12 holding the visor 16 thereto, the likelihood of creasing the visor 16 would increase because a wearer would attempt to force visor 16 to conform to the facial contours with the mask 12. The visor 16 is placed so that approximately $\frac{1}{3}$ of its depth D covers mask 12. In one embodiment, the depth D is $3\frac{3}{8}$ inches and a width W is $7\frac{1}{2}$ inches.

In the approximate middle of visor 16 adjacent the mask 12 is a notch 20. The notch 20 is designed to assist the visor 16 to gradually bend around the nose 14 of a wearer without creasing. In one embodiment, notch 20 resembles a keyhole; in this embodiment, the notch 20 comprises a circular portion 21 and a narrow slot 23. The circular portion 21 may have a $\frac{1}{8}$ of an inch radius and a narrow slot 23 may have a tapered opening from $\frac{1}{4}$ of an inch at A to $\frac{1}{8}$ of an inch at B. The length C of notch 20 may be approximately $\frac{5}{8}$ of an inch. As mask 12 is fitted over the face of a wearer, notch 20, which does not receive the nose, allows for any warping, bending and twisting of the visor 16.

Visor 16 slopes gradually upward from proximate each bond area 48 and 50 to notch 20 to form arcuate surfaces 52. The notch 20 and the arcuate surfaces 52 allow visor 16 to bend when the mask 12 is placed over the face of the wearer to approximately place the arcuate surfaces 52 in contact with a first fold line 54 of mask 12. The contact of fold line 54 with arcuate surfaces 52 tends to close any gaps between the visor 16 and the mask 12.

A darkened strip 22 of material may be applied to the top edge of mask 12 adjacent visor 16. Strip 22 may comprise any suitable material such as treated cover stock similar to the outermost surface 30 of the mask 12. The strip 22 is preferably black in color to prevent or reduce glare and reflections into the eyes 18 of the wearer. The darkened strip 22 is used in the same fashion as, for example, the darkened areas placed under most professional football players' eyes.

A cushioning strip 80 may be applied to the upper portion of visor 16. The cushioning strip is made of a flexible, spongy material, for example a synthetic foam such as a polyurethane foam. The cushioning strip 80 distributes the pressure associated with securing visor 16 to the wearer's head 26 over a larger area of the wearer's forehead.

Figure 3:
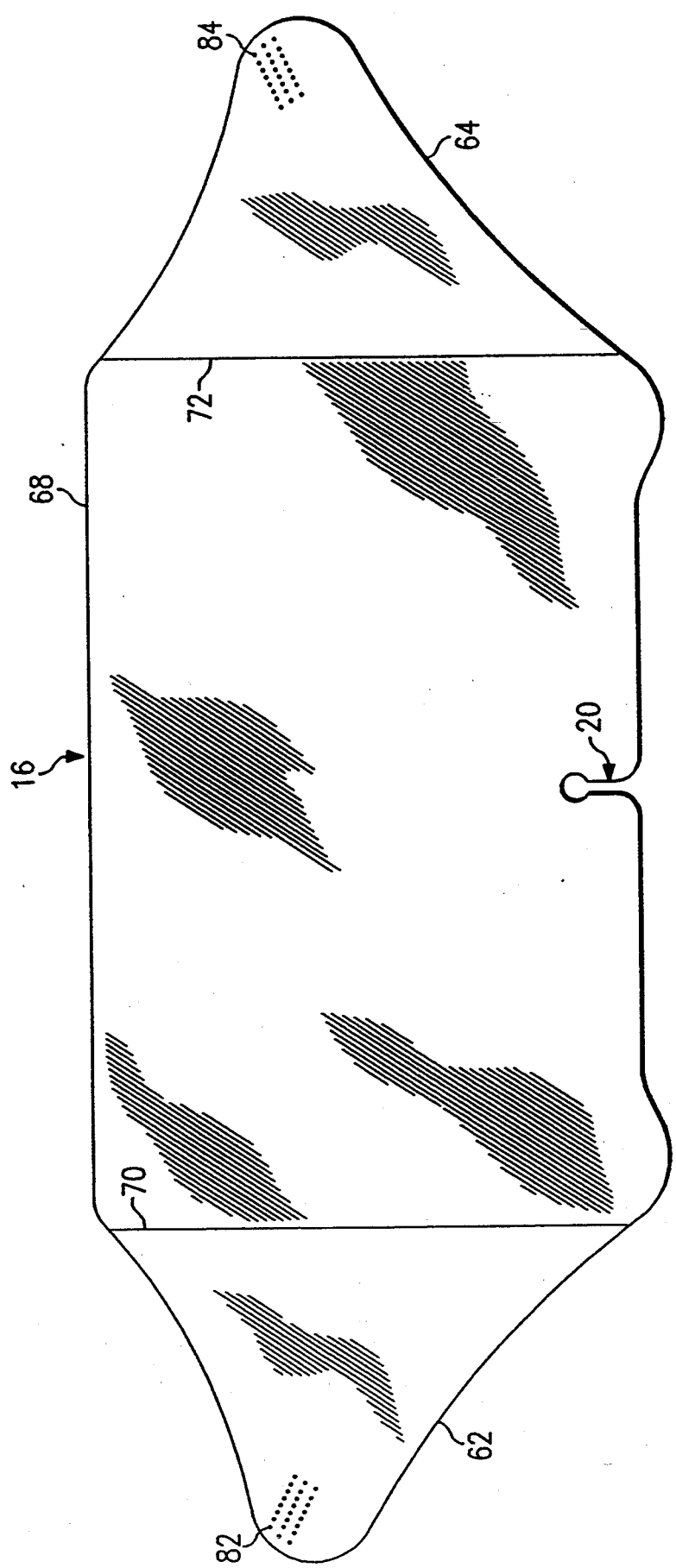
FIG. 3 is a front elevational view of a visor showing one embodiment of the present invention.

Referring now to FIG. 3, a front elevational view of one embodiment of the present invention is shown. The visor 16 includes foldable side extensions 62 and 64. Foldable side extension 62 and 64 are integral to the main body 68 of visor 16. Edges 70 and 72 are scored or creased so that side extensions 62 and 64 are not co-planar with the main body 68 of visor 16, but rather extend toward the ears of the wearer so as prevent fluids propelled from a side angle relative to the wearer face from making contact with the wearer's eyes 18. Tie strips 44 (FIG. 4) may be attached to the visor 16 on the foldable side extensions 62 and 64 at bonding areas 82 and 84. Additionally, visor 16 has notch 20 which allows the visor to conform to wearer's face without creating creases.

Referring now to FIG. 4, there is a shown a front elevational view of one embodiment of the present invention. The visor 16 is shown as previously discussed, but to the main body 68 of the visor 16 has been attached a cushioning strip 80. The cushioning strip 80 may be seen as viewed through the transparent visor 16. Tie strips 44 are shown attached to the visor at bonding areas 82 and 84 of the lateral edges of side extensions 62 and 64 and to the mask and visor at bonding areas 48 and 50.

Referring to FIG. 5, there is shown a side elevational view of a portion of an embodiment of the present invention detailing the application of the cushioning strip 80 to the main body 68 of visor 16. The cushioning strip 80 may be attached to the main body 68 of visor 16 by gluing, heat sealing, or ultra-sonic sealing.

In operation, the visor 16 is secured to the mask 12 at the bond areas 48 and 50 and to the tie strips 44 at bond areas 48, 50, 82 and 84. A wearer places the mask 12 over his or her mouth and nose with the visor 16 extending over his or her eyes. The tie strips 44 are then tied around the head 26 to secure the protective shield 10 to the wearer. The wearer of the shield 10 may form the mask 12 as required to the shape of his or her face by molding strip 46 to the contours of the face. Due to the combination of notch 20, the bond areas 48 and 50, the arcuate surfaces 52, the side extensions 62 and 64, visor 16 will tend to bend around the face of the wearer. Additionally, the visor 16 will not be creased, and the area between the arcuate surfaces 52 and the first fold 54 will be approximately in contact with each other. Furthermore, side extensions 62 and 64 will wrap around the corner of wearer's face so that the wearer is protected from liquids thrown or splashed from almost any angle, and because of cushion strip 80 and the adjustment of molding strip 46, the wearer may wear the mask comfortably for long periods of time. Bonding areas 82 and 84 cooperate with tie strips 44 to further aid in conforming visor 16 with the wearer's head.

It is to be understood that a visor constructed in accordance with the present invention may be fixed to a mask that is not designed to retard the flow of liquids. If so, the visor will still serve to protect the eyes from liquids, but the nose and mouth may quickly come into contact with fluids, which creates the inherent risks associated therewith.

Although the present invention has been described in detail with respect to alternative embodiments, various changes and modifications may be suggested to one skilled in the art, and it should be understood that various changes, substitutions, and alterations can be made hereto without departing from the spirit and scope of the invention as defined by the appended claims.

What is claimed is:

1. A method of manufacturing a liquid shield to protect the eyes of a wearer, comprising the steps of;
    forming a visor from clear plastic having a first extension and a second extension;
    forming a notch along a bottom edge between opposite ends of said visor;
    dimensioning said visor to fit over the eyes of a wearer and said extensions to cover each said side of said wearer's face;
    securing a first tie strip to said first extension and a second tie strip to said second extension to hold said visor near wearer's face;
    securing a cushioning strip near the upper edge of said visor; and
    wherein the step of forming a notch further comprises forming a circular portion and a narrow slot portion to facilitate the conformance of said visor to the face of the wearer and to reduce the likelihood of reflections.

* * * * *